(12) United States Patent
Tsai

(10) Patent No.: US 8,010,468 B2
(45) Date of Patent: Aug. 30, 2011

(54) METHOD FOR WAFER ANALYSIS WITH ARTIFICIAL NEURAL NETWORK AND SYSTEM THEREOF

(75) Inventor: Ming-Chin Tsai, Hsin-Chu (TW)

(73) Assignee: King Yuan Electronics Co., Ltd., Hsin-chu (TW)

( * ) Notice: Subject to any disclaimer, the term of this patent is extended or adjusted under 35 U.S.C. 154(b) by 987 days.

(21) Appl. No.: 11/872,414

(22) Filed: Oct. 15, 2007

(65) Prior Publication Data

US 2008/0301073 A1 Dec. 4, 2008

(30) Foreign Application Priority Data

Jun. 1, 2007 (TW) .............................. 96119747 A

(51) Int. Cl.
*G06E 1/00* (2006.01)
*G06F 15/18* (2006.01)

(52) U.S. Cl. .............. 706/19; 700/121; 702/97; 702/99; 438/5

(58) Field of Classification Search ........................ None
See application file for complete search history.

(56) References Cited

U.S. PATENT DOCUMENTS

2003/0229410 A1* 12/2003 Smith et al. .................. 700/109
2008/0183412 A1* 7/2008 Funk et al. ...................... 702/97

\* cited by examiner

*Primary Examiner* — Omar Fernandez Rivas
*Assistant Examiner* — Kalpana Bharadwaj
(74) *Attorney, Agent, or Firm* — Muncy, Geissler, Olds & Lowe, PLLC

(57) ABSTRACT

A method for wafer analysis with artificial neural network and the system thereof are disclosed. The method of the system of the present invention has several steps, including: first of all, providing a test unit for wafer test and generating a plurality of test data; next, transmitting the test data to a processing unit for transferring to output data; then, comparing the output data with predictive value and modifying bias and making the output data close to the predictive value, and repeating the steps mentioned above to train this system; finally, analyzing wafers by the trained system. Using this system to analyze wafers not only saves time, but also reduces manpower and the risk resulting from artificial analysis.

34 Claims, 8 Drawing Sheets

|    | site 1 | site 2 | site 3 | site 4 | site 5 | site 6 |
|----|--------|--------|--------|--------|--------|--------|
| 1  | -1 | 1  | 1  | 1  | 1  | 1  |
| 2  | -1 | 1  | 1  | 1  | 1  | 1  |
| 3  | -1 | 1  | 1  | 1  | -1 | 1  |
| 4  | -1 | -1 | 1  | 1  | 1  | -1 |
| 5  | -1 | 1  | 1  | 1  | 1  | -1 |
| 6  | -1 | 1  | 1  | 1  | 1  | 1  |
| 7  | -1 | 1  | 1  | 1  | -1 | 1  |
| 8  | -1 | 1  | 1  | -1 | 1  | -1 |
| 9  | -1 | 1  | 1  | 1  | -1 | 1  |
| 10 | -1 | -1 | 1  | 1  | 1  | 1  |
| 11 | -1 | 1  | 1  | -1 | 1  | 1  |
| 12 | -1 | 1  | 1  | 1  | 1  | 1  |
| 13 | -1 | 1  | 1  | 1  | 1  | 1  |
| 14 | -1 | 1  | -1 | 1  | -1 | 1  |
| 15 | -1 | 1  | 1  | -1 | 1  | -1 |
| 16 | -1 | 1  | 1  | 1  | 1  | 1  |
| 17 | -1 | 1  | 1  | 1  | 1  | 1  |
| 18 | -1 | -1 | 1  | 1  | 1  | 1  |
| 19 | -1 | 1  | 1  | 1  | 1  | 1  |
| 20 | -1 | -1 | 1  | 1  | 1  | 1  |
| 21 | -1 | -1 | 1  | 1  | 1  | 1  |
| 22 | -1 | 1  | -1 | 1  | -1 | 1  |
| 23 | -1 | 1  | 1  | 1  | -1 | -1 |
| 24 | -1 | 1  | -1 | 1  | 1  | 1  |
| 25 | -1 | 1  | 1  | 1  | 1  | 1  |
| 26 | -1 | 1  | 1  | -1 | 1  | 1  |
| 27 | -1 | -1 | 1  | 1  | 1  | -1 |
| 28 | -1 | 1  | 1  | 1  | 1  | 1  |
| 29 | -1 | 1  | -1 | 1  | -1 | 1  |
| 30 | -1 | 1  | 1  | 1  | -1 | 1  |
| 31 | -1 | 1  | 1  | 1  | 1  | 1  |
| 32 | -1 | 1  | 1  | 1  | -1 | -1 |
| 33 | -1 | 1  | 1  | 1  | -1 | 1  |
| 34 | -1 | 1  | -1 | 1  | 1  | 1  |
| 35 | -1 | 1  | 1  | 1  | 1  | 1  |
| 36 | -1 | 1  | 1  | 1  | 1  | 1  |
| 37 | -1 | 1  | -1 | 1  | 1  | 1  |
| 38 | -1 | 1  | 1  | 1  | 1  | 1  |
| 39 | -1 | 1  | 1  | 1  | 1  | 1  |
| 40 | -1 | -1 | -1 | 1  | 1  | 1  |
| 41 | -1 | -1 | 1  | 1  | -1 | 1  |
| 42 | -1 | 1  | 1  | 1  | 1  | 1  |
| 43 | -1 | 1  | 1  | 1  | 1  | -1 |
| 44 | -1 | 1  | 1  | 1  | 1  | 1  |
| 45 | -1 | 1  | 1  | 1  | 1  | 1  |
| 46 | -1 | 1  | 1  | 1  | -1 | 1  |
| 47 | -1 | 1  | 1  | 1  | 1  | 1  |
| 48 | -1 | 1  | 1  | 1  | 1  | 1  |
| 49 | -1 | 1  | 1  | 1  | 1  | 1  |
| 50 | -1 | -1 | 1  | 1  | 1  | -1 |

FIG. 5

METHOD FOR WAFER ANALYSIS WITH ARTIFICIAL NEURAL NETWORK AND SYSTEM THEREOF

BACKGROUND OF THE INVENTION (1) Field of the Invention

The present invention relates to a method for wafer analysis. More particularly, the present invention relates to a method utilizing artificial neural network for wafer analysis.

(2) Prior Art

There are numerous steps in wafer fabrication. In these steps, there must be some measuring and monitoring operations for qualification. The quality of wafer fabrication could be analyzed by some data such as film thickness, electricity, electric resistance, and impurity concentration etc. Then, the problems of product could be found in time to prevent the waste of cost.

In tradition, the way to monitor the quality of wafers is to test the same site continuously for several times and check if any error exists in machine. If any error does exist, the cause of the error is usually examined by human operator with experience to analyze, determine the cause and to improve the process. Although this method could solve problem and get improvement of wafer fabrication, it wastes too much time and manpower. Besides, the risk of manpower does exist. Experience deficiency of analysis and a wrong judgment would cause more waste of time and manpower, and increase the cost.

FIG. 1 shows a schematic diagram of risk analysis for wafer analysis. After all process of wafer fabrication 102 completed, all wafers 101 could be divided into two parts, good wafers 103 and bad wafers 104, respectively. Then, after the step of wafer test 105, the part of good wafers 103 could get the result of pass 106 and the part of bad wafers 104 could get the result of fail 107. However, sometimes wrong judgment could happen. Such as the part of good wafers 103 would get the result of fail 107 and result in risk of product 108; or the part of bad wafers 104 could get the result of pass 106 and result in risk of consumer 109. Both risk of product 108 and risk of consumer 109 resulting from the wrong judgment would cause great loss.

Therefore, it is necessary to provide a method for wafer analysis which could save time and reduce risk of wrong judgment.

SUMMARY OF THE INVENTION

An object of the present invention is to solve problems of the wastes of time and manpower in wafer analysis. Besides, there are still some risks by using artificial analysis. If experience and ability of judgment of analyzers are not enough to make correct analyses, incorrect analyses might cause more waste of time and manpower.

To achieve the object mentioned above, the present invention utilizes the theory and concept of artificial neural network, and combines JAVA software to create a system which could monitor the testing result and analyze abnormal conditions. The steps of the method of the system of the present invention include: first of all, providing a test unit for wafer test and generating a plurality of test data; next, transmitting the test data to a processing unit for transferring to output data; then, comparing the output data with predictive value and modifying bias and making the output data close to the predictive value, and repeating the steps mentioned above to train this system; finally, analyzing wafers by the trained system. The invention constantly provides all abnormal results of current wafer test to train the system with cumulative experiences. The system could analyze any future abnormal condition and find root cause in time with the cumulative experiences.

The efficacy of the present invention is to replace the system with human resource. Using this system to analyze wafers not only saves time, but also reduces manpower and the risk resulting from artificial analysis.

In the following description of the preferred embodiment, reference is made to the accompanying drawings which form a part hereof, and in which is shown by way of illustration a specific embodiment in which the invention may be practiced.

BRIEF DESCRIPTION OF THE DRAWINGS

FIG. 5 is a schematic diagram of one embodiment of test result of the present invention.

DETAILED DESCRIPTION OF THE INVENTION

Figure 1:
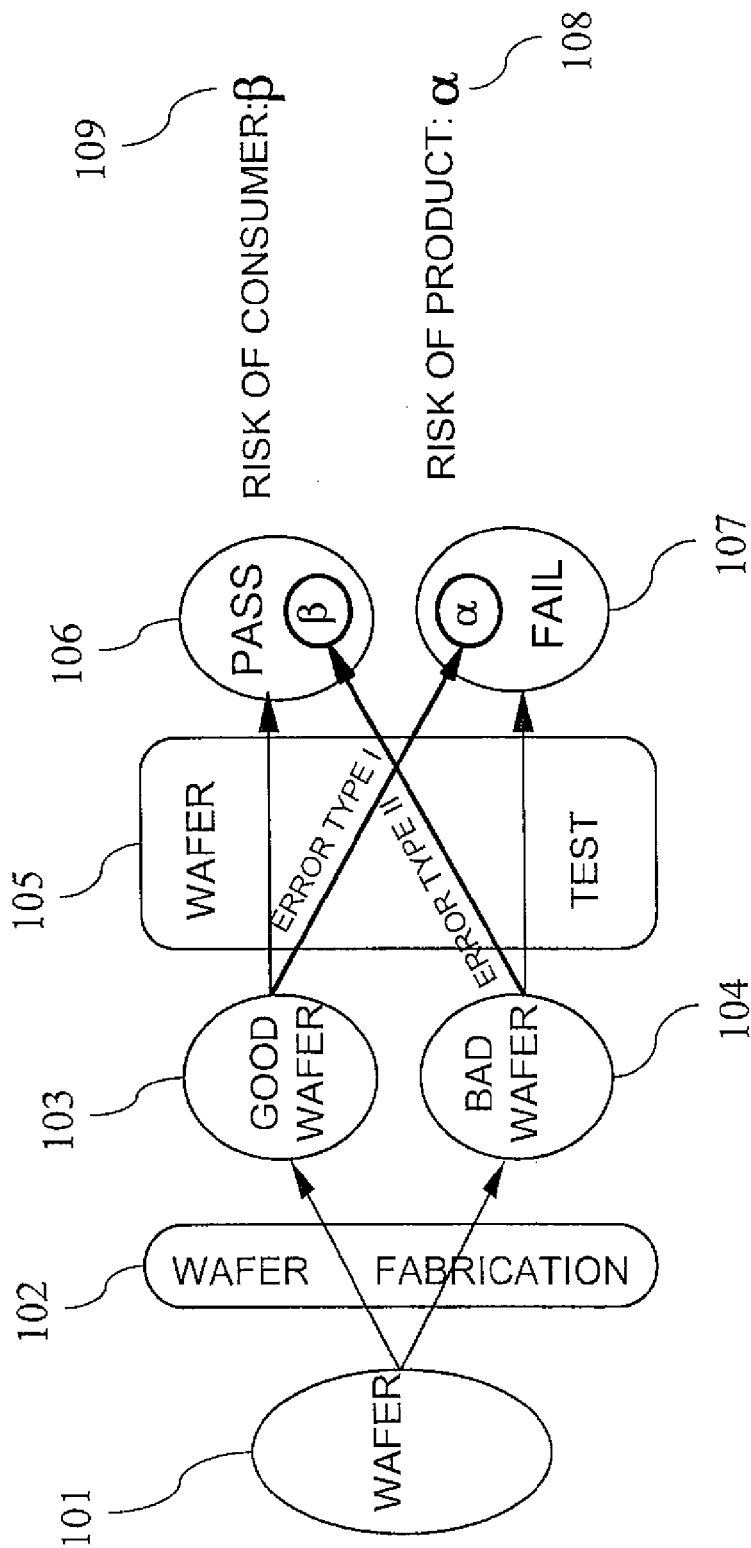
FIG. 1 is a schematic diagram showing risk of wafer analysis.
Figure 2:
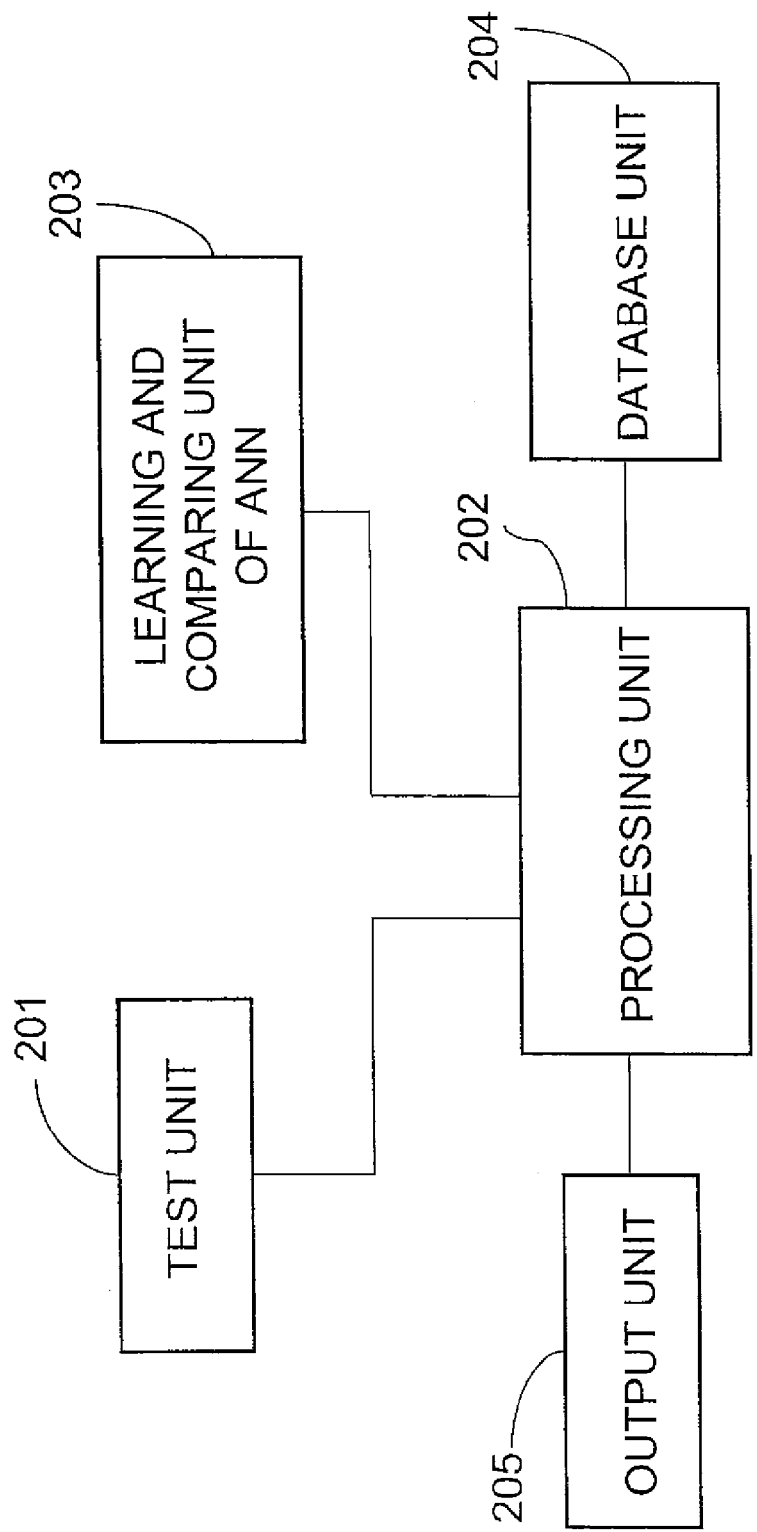
FIG. 2 is a schematic diagram of one embodiment of the system of the present invention.

FIG. 2 shows one embodiment of a wafer analysis system of the present invention, which includes a processing unit 202 and a learning and comparing unit of artificial neural network (ANN) 203. Test data from a test unit 201 are received by the processing unit 202. The learning and comparing unit of ANN 203 is connected with the processing unit 202. The test data are computed in the learning and comparing unit of ANN 203 by instructions from the processing unit 202. The computed test data are compared with a predictive value in a database 204 by the learning and comparing unit of ANN 203 for training the system to make results of systematic analysis approach to results of artificial analysis. Finally, the results are outputted by an output unit 205.

In an embodiment, the test unit 201 could be a plurality of testers, which could test wafer and provide test data to the processing unit 202. The processing unit 202 could be a computer in this embodiment, and the computer includes at least a processor and a memory. Moreover, the computer is installed with software of the learning and comparing unit of ANN 203 and database unit 204. Therefore, the test data could be transferred by the system to an output data, and the output data could be outputted by the output unit 205. The learning and comparing unit of ANN 203 comprises a computer-readable medium having programmable instructions of artificial neural network which would be written by JAVA programmable language. Results of wafer test could be analyzed by executing these instructions. In this embodiment, the database unit 204 comprises hard disks, CD-ROM, RAM (random access memory), or ROM (read-only memory).

Figure 3:
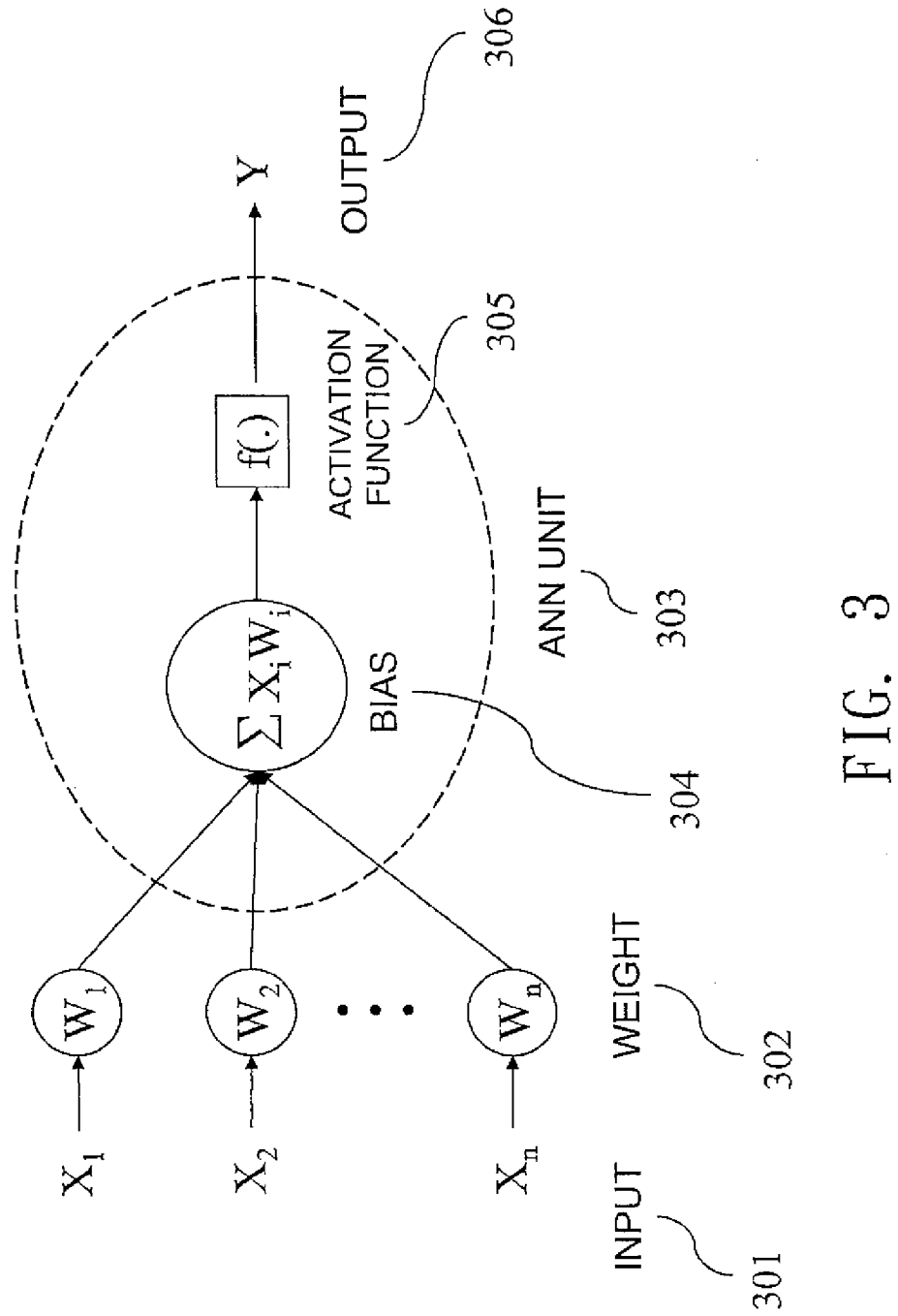
FIG. 3 is a schematic diagram of one embodiment of a model of artificial neural network.

FIG. 3 shows a model of artificial neural network, which describes logic operators of the wafer analysis system of the present invention. The symbol X means the input 301 of neural unit, and the symbol W means weight 302. The symbol ΣXiWi means bias 304, which express a summation of each input multiplied by the weight. The symbol f(.) means an activation function 305, which has several types and usually is a non-linear function. The purpose of the activation function is used as a mapping function to obtain an output (Y) 306 by utilizing bias 304. The output 306 is the result which we want. The input 301 is multiplied by the weight 302 and sent into an artificial neural network (ANN) unit 303 for operation. The bias 304 is adjusted to larger or smaller for training the artificial neural network. The initial value of the bias 304 is usually between +1 and −1 generated at random. The bias 304 could be considered to a kind of weighted effect. When the bias 304 is large, the connected ANN unit 303 would be stimulated more easily and the artificial neural network would be influenced more. Otherwise, there is almost no influence to the artificial neural network when the bias 304 is small. Therefore, small bias 304 usually could be deleted for saving time and space of the computer.

Figure 4:
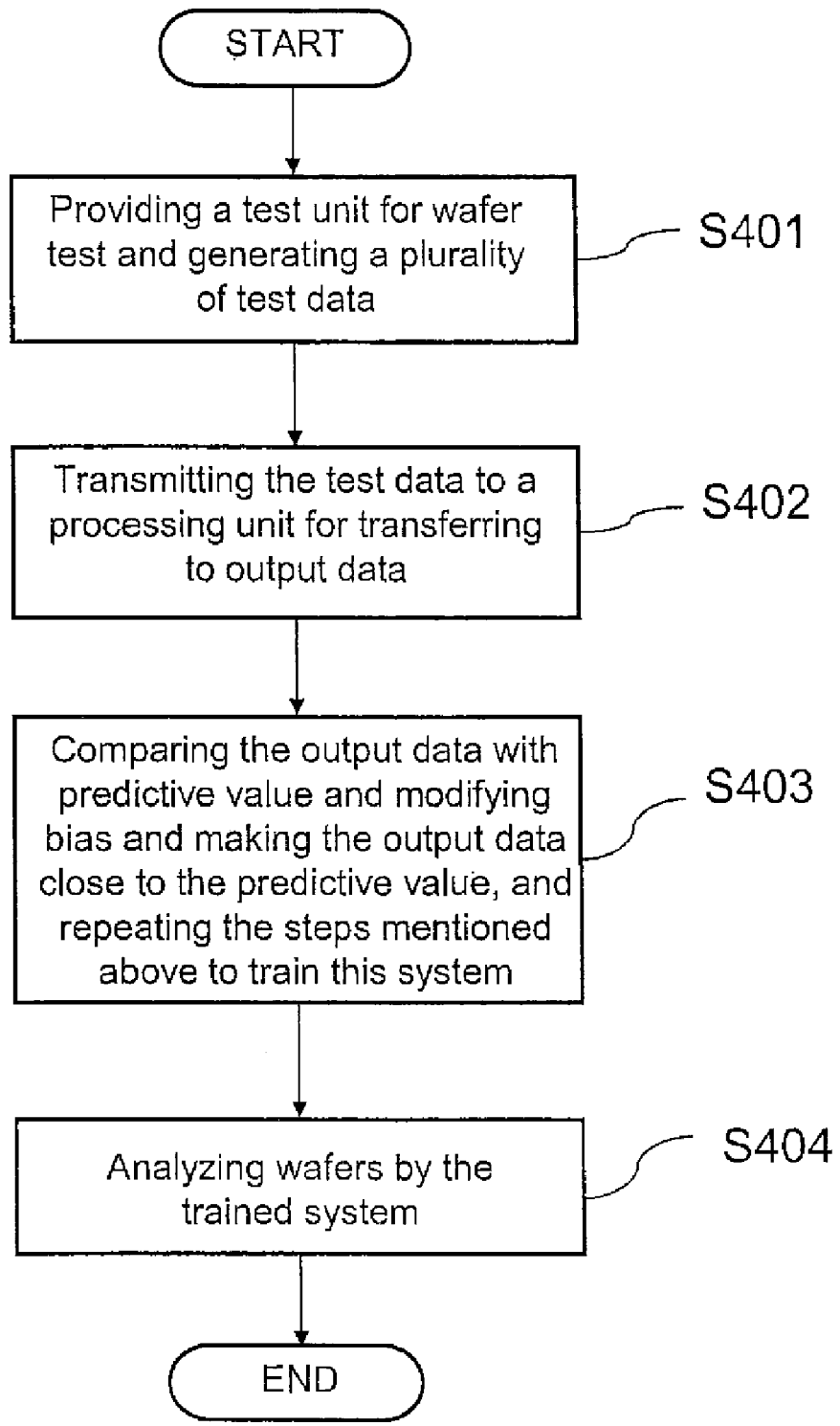
FIG. 4 is a flow chart of one embodiment of the system of the present invention.

FIG. 4 shows a flow chart of one embodiment of the system of the present invention. At processing block S401, test data are provided by a test unit after wafer test. In this embodiment, a wafer having three hundred dies is provided to be tested, and six dies are tested at the same time, Therefore, all dies could be tested after fifty times. After wafer test is completed, the test data of wafer test are received by the wafer analysis system of the present invention.

At processing block S402, the test data are transmitted to a processing unit for transferring to output data. In this embodiment, the test data are received and transferred to be an output data by the wafer analysis system. The transferring process would be described detail in FIG. 6 later.

At processing block S403, the output data is compared with a predictive value and changed by modifying bias to close to the predictive value. This system could be trained by repeating the steps mentioned above. Because the output data which generated by an un-trained artificial neural network might be not equal to the predictive value, the step of comparing the output data with the predictive value is necessary. By repeating the steps S401 to S403, the artificial neural network system could be trained to identify output data of any kinds of result of wafer test, which include normal result and abnormal results such as line fail, local fail (edge), local fail (ring), low yield, site unbalance, etc. The magnitude and range of these kinds of output data having different values could be set by user before training the system. All abnormal conditions in wafer test could be provided continuously during of training of the system. Through enough training times and experiences of the system, the purpose which the output data could be close to the predictive value would be reached.

At processing block S404, wafer could be analyzed by the trained system. In analyzing wafers, the corresponding output data could be found out by the trained system having an ability which is similar to human experiences, and the output data could be stored and transferred to the tester. Moreover, the tester having problems would alarm and stop test, and the relevant engineer could deal with the problems. Therefore, wafers are identified and divided to several conditions by the trained system, which include: normal, line fail, local fail (edge), local fail (ring), low yield and site unbalance. For example, a linear abnormal wafer artificially identified will also be identified by the trained artificial network system, and a signal of "line fail" would be obtained.

FIG. 5 shows a test result of one embodiment of the present invention. In FIG. 5, the value 1 means the test result for pass, and the value −1 means the test result for fail. The value 0 means un-tested. Each site of the wafer has a value, and the test data could be divided into fifty sets and each set has six test values.

Figure 6:
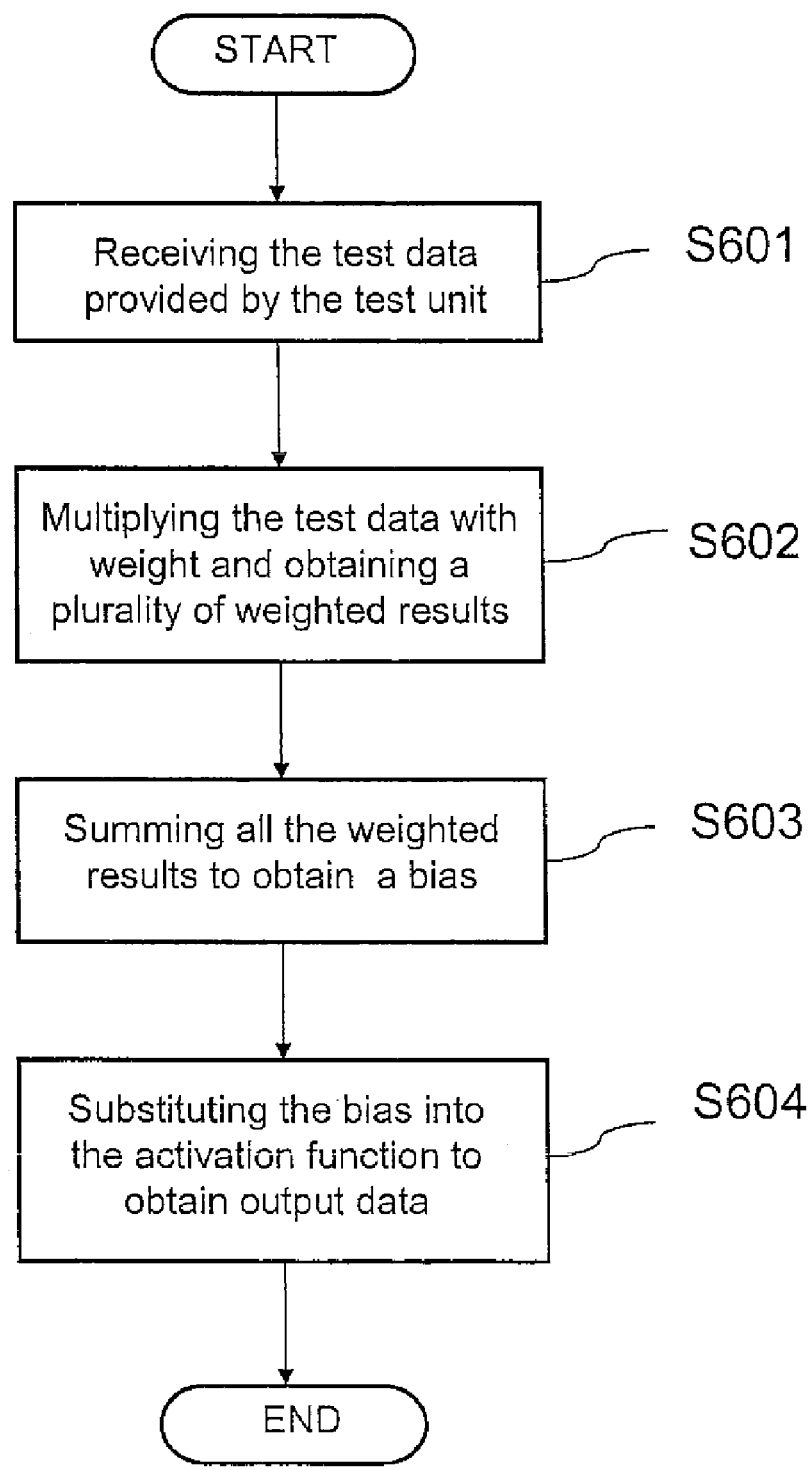
FIG. 6 is a flow chart of one embodiment of transferring process of the system of the present invention.

FIG. 6 shows a flow chart of the transferring process of S402 in FIG. 4. At processing block S601, the test data provided by the test unit is received. At processing block S602, the test data are multiplied with weight and a plurality of weighting results would be obtained. In this embodiment, fifty sets of the test data are calculated respectively by the artificial neural network system, and six test values of each set are multiplied with a weight individually. Because the value of weight would be converged to a constant value, it doesn't need to be defined. Therefore, the test data still are fifty sets and six values of each set are multiplied with a weight. The result is called "weighted results".

At processing block S603, all the weighted results are summed and a bias would be obtained. In this step, the test data are fifty sets, however, each set has just one value.

At processing block S604, the bias is substituted into the activation function to obtain an output data. In this step, the activation function would be different according to different model of artificial neural network. However, the purpose of the activation function is to transfer the bias in step S603 to be an output data, which is between 0 and 1. Therefore, the result of wafer test could be judged according to the output data.

The value of the output data calculated by the artificial neural network system are not necessarily an integral. For example, the predictive value of site unbalance which is one kind of abnormal condition is 1 for abnormal condition, and the predictive value is 0 for normal condition. Then, the judgment of the artificial neural network could be "site unbalance" if the value of output data is larger than 0.5. Otherwise, the judgment could be "normal" if the value of output data is smaller than or equal to 0.5. Besides, there is another way to define site unbalance. The predictive value of site unbalance is (0, 1) for abnormal condition and (1, 0) for normal condition. Therefore, the judgment of the artificial neural network could be defined by a formula (a, b). The judgment could be "site unbalance" if the value of "a" is smaller than the value of "b". Otherwise, the judgment could be "normal" if the value of "a" is larger than or equal to the value of "b".

Figure 7:
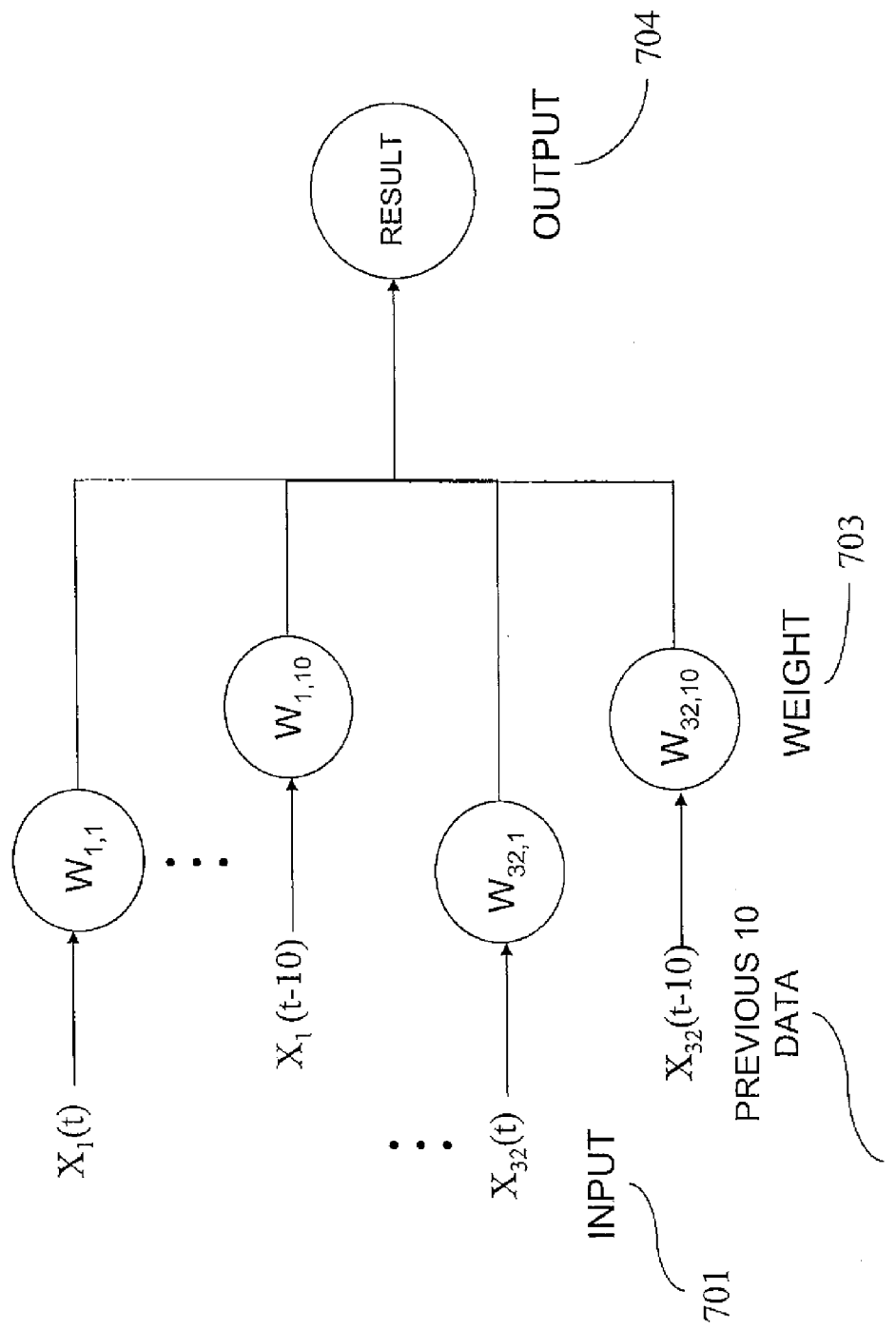
FIG. 7 is a schematic diagram of one embodiment of model of time delay artificial neural network.

FIG. 7 shows a model of a time delay neural network which is one of two major models of artificial neural network of the invention. Input data 701 include $X_1(t)$~$X_{32}(t)$. The artificial neural network system can be defined to memorize the previous ten input data. For example, the ten input data 702 previous to the input data including $X_1(t-10)$~$X_{32}(t-10)$ 701 are also included to be calculated. This particular feature of the time delay artificial neural network system is a memory function which is used to expand input data range being calculated by defining and memorizing the previous input data and calculating the previous and present input data at the same time. The advantage of this feature is to use the previous input data as reference data to train the current artificial neural network so that the trained artificial neural network can generate more significant result of wafer analysis.

Figure 8:
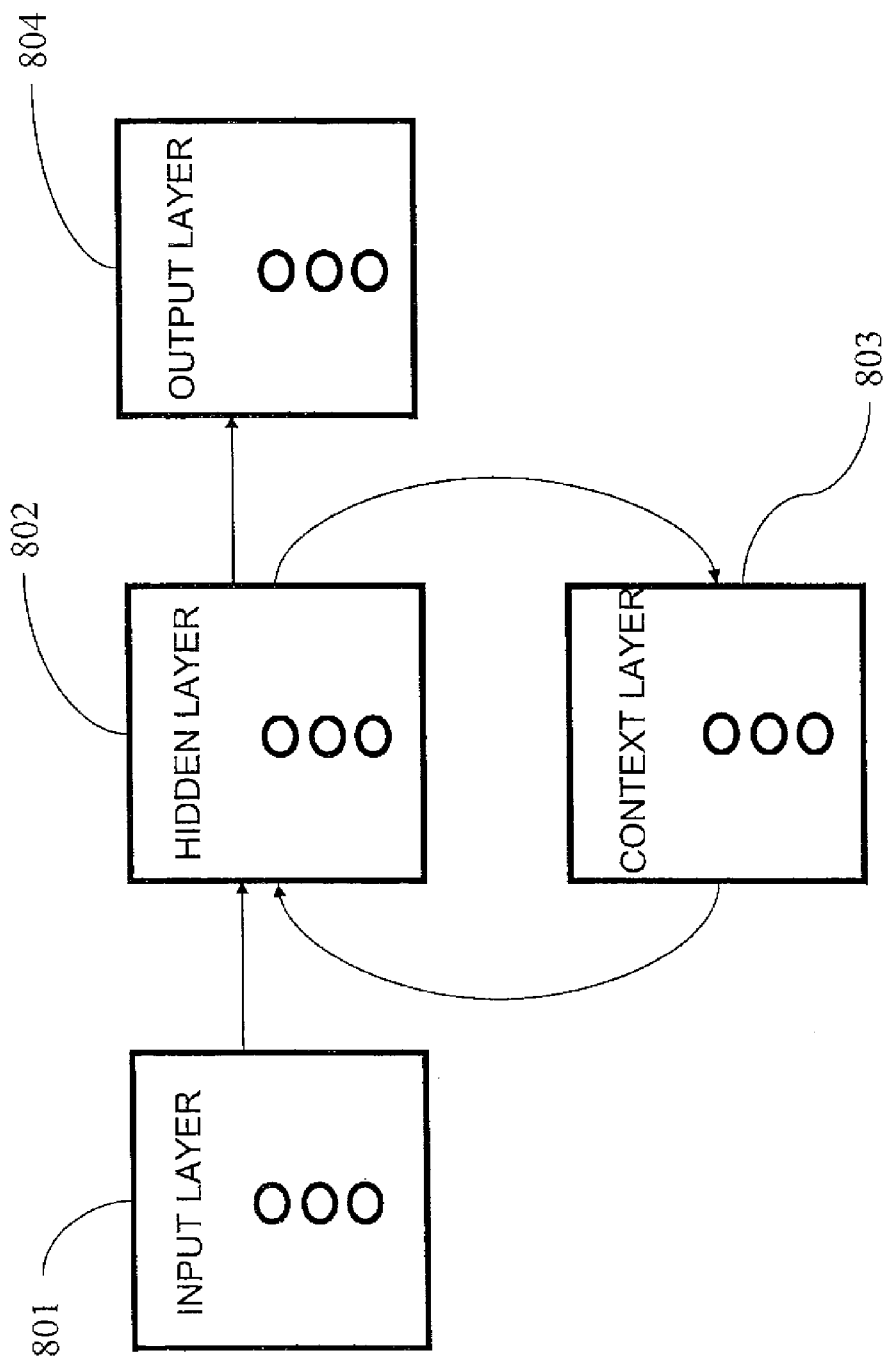
FIG. 8 is a schematic diagram of one embodiment of model of recurrent artificial neural network.

FIG. 8 shows a model of recurrent neural network which is another model of artificial neural network of the invention. The calculated data will be transmitted into hidden layer 802 from context layer 803 to be calculated together with the data in input layer 801 when the data are calculated in hidden layer 802. The result then will be transmitted to output layer 804. The specific feature of the recurrent neural network system is data accumulation during calculation. All data used to train the artificial neural network system are included, but those old enough data will be gradually ignored to maintain a trained and effective artificial neural network model. The advantage of this recurrent neural network is the capability of accurately judging and analyzing data. However, the speed of calculation is slower than that of the time delay artificial neural network due to the large data quantity.

The test result obtained from wafer test such as line fail or local fail could be used to train the above-mentioned models of artificial neural network. The trained artificial neural network will use the bias obtained by training to calculate the result. This result is used to determine the condition of wafer test. The tester reacts according to the condition, and alarm and stop test automatically, when the condition is abnormal.

Artificial neural network could establish a non-linear model, and except various kinds of variable to be input data. Moreover, the more quantity of data stored in artificial neural network system, the higher accuracy result would be obtained. Therefore, applying the skills of artificial neural network in wafer analysis not only saves time and improves efficiency and accuracy, but also reduces manpower and the risk resulting from artificial analysis.

The specific arrangements and methods herein are merely illustrative of the principles of this invention. Numerous modifications in form and detail may be made by those skilled in the art without departing from the true spirit and scope of the invention.

What is claimed is:

1. A system for wafer analysis, including:
   a processing unit for receiving test data from a test unit for a wafer test; and
   a learning and comparing of artificial neural network unit which connects with said processing unit and receives instructions from said processing unit to compute said test data, and compares computation with data from a database for making results of systematic analysis approach to results of artificial analysis;
   whereby said system saves time of wafer analysis,
   wherein said test data is transferred by said processing unit to be an output data, and
   wherein the value of said output data are between 0 and 1, and the judgment is definable by 0.5.

2. The system of claim 1, wherein said test unit comprises a plurality of testers.

3. The system of claim 1, wherein said processing unit includes at least a processor and a memory.

4. The system of claim 1, wherein said learning and comparing of artificial neural network unit comprises a computer-readable medium having instructions of artificial neural network written by JAVA programmable language which analyzes result of wafer test by executing said instructions.

5. The system of claim 1, wherein said database unit comprises hard disks, CD-ROM, RAM (random access memory), or ROM (read-only memory).

6. The system of claim 1, wherein said transferring process further comprises:
   multiplying said test data with a weight and getting a plurality of weighted results;
   summing all said weighted results to obtain a bias; and
   substituting said bias into an activation function to obtain output data.

7. The system of claim 1, wherein said output data comprise results of wafer analysis including normal, line fail, or local fail.

8. The system of claim 1, wherein when said output data are abnormal, and said test unit would alarm and stop.

9. The system of claim 1, wherein said output data is definable in (a, b) formula, and the judgment is definable by $a<b$ or $a>b$.

10. A system for wafer analysis, including:
    a processing unit for receiving test data from a test unit for a wafer test;
    a learning and comparing of artificial neural network unit which connects with said processing unit and receives instructions from said processing unit to compute said test data; and
    a database unit which connects with said processing unit for saving data, and provides said saving data to said learning and comparing of artificial neural network unit to compare for making results of systematic analysis approach to results of artificial analysis;
    whereby said system saves time of wafer analysis,
    wherein said test data is transferred by said processing unit to be an output data, and
    wherein the value of said output data are between 0 and 1, and the judgment is definable by 0.5.

11. The system of claim 10, wherein said test unit comprises a plurality of testers.

12. The system of claim 10, wherein said processing unit includes at least a processor and a memory.

13. The system of claim 10, wherein said learning and comparing of artificial neural network unit comprises a computer-readable medium having instructions of artificial neural network written by JAVA programmable language which analyzes result of wafer test by executing said instructions.

14. The system of claim 10, wherein said database unit comprises hard disks, CD-ROM, RAM, or ROM.

15. The system of claim 10, wherein said transferring process further comprises:
    multiplying said test data with a weight and getting a plurality of weighted results;
    summing all said weighted results to obtain a bias; and
    substituting said bias into an activation function to obtain output data.

16. The system of claim 10, wherein said output data comprise results of wafer analysis including normal, line fail, or local fail.

17. The system of claim 10, wherein when said output data are abnormal, and said test unit would alarm and stop.

18. The system of claim 10, wherein said output data is definable in (a, b) formula, and the judgment is definable by $a<b$ or $a>b$.

19. A method for wafer analysis utilizing artificial neural network system, including:
    (a) providing a test unit for wafer test and generating a plurality of test data;
    (b) transmitting said test data to a processing unit for transferring to output data;
    (c) comparing said output data with predictive value and modifying bias and making the output data close to said predictive value, and repeating the steps mentioned above to train this system; and
    (d) analyzing wafers by the trained system;
    whereby said method saves time of wafer analysis,
    wherein the value of said output data are between 0 and 1, and the judgment is definable by 0.5.

20. The method of claim 19, wherein said test data could be provided by a plurality of testers.

21. The method of claim 19, wherein said processing unit includes at least a processor and a memory.

22. The method of claim 19, wherein said transferring process further comprises:
   multiplying said test data with a weight and getting a plurality of weighted results;
   summing all said weighted results to obtain a bias; and
   substituting said bias into an activation function to obtain output data.

23. The method of claim 19, wherein said artificial neural network comprises a time delay artificial neural network or a recurrent artificial neural network.

24. The method of claim 19, wherein said output data comprise results of wafer analysis including normal, line fail, or local fail.

25. The method of claim 19, wherein when said output data are abnormal, and said test unit would alarm and stop.

26. The method of claim 19, wherein said output data is definable in (a, b) formula, and the judgment is definable by a<b or a>b.

27. A computer-readable medium having computer-executable instructions for performing a method for wafer analysis utilizing artificial neural network system, comprising:
   (a) providing a test unit for wafer test and generating a plurality of test data;
   (b) transmitting said test data to a processing unit for transferring to output data;
   (c) comparing said output data with predictive value and modifying bias and making the output data close to said predictive value, and repeating the steps mentioned above to train this system; and
   (d) analyzing wafers by the trained system;
   whereby said method saves time of wafer analysis,
   wherein the value of said output data are between 0 and 1, and the judgment is definable by 0.5.

28. The computer-readable medium of claim 27, wherein said test data are provided by a plurality of testers.

29. The computer-readable medium of claim 27, wherein said processing unit includes at least a processor and a memory.

30. The computer-readable medium of claim 27, wherein said transferring process further comprises:
   multiplying said test data with a weight and getting a plurality of weighted results;
   summing all said weighted results to obtain a bias; and
   substituting said bias into an activation function to obtain output data.

31. The computer-readable medium of claim 27, wherein said artificial neural network comprises a time delay artificial neural network or a recurrent artificial neural network.

32. The computer-readable medium of claim 27, wherein said output data comprise results of wafer analysis including normal, line fail, or local fail.

33. The computer-readable medium of claim 27, wherein when said output data are abnormal, said test unit would alarm and stop.

34. The computer-readable medium of claim 27, wherein said output data is definable in (a, b) formula, and the judgment is definable by a<b or a>b.

* * * * *